June 7, 1932.  J. O. WOODSOME  1,862,130
VENTURI STEAM FITTING
Filed March 12, 1928
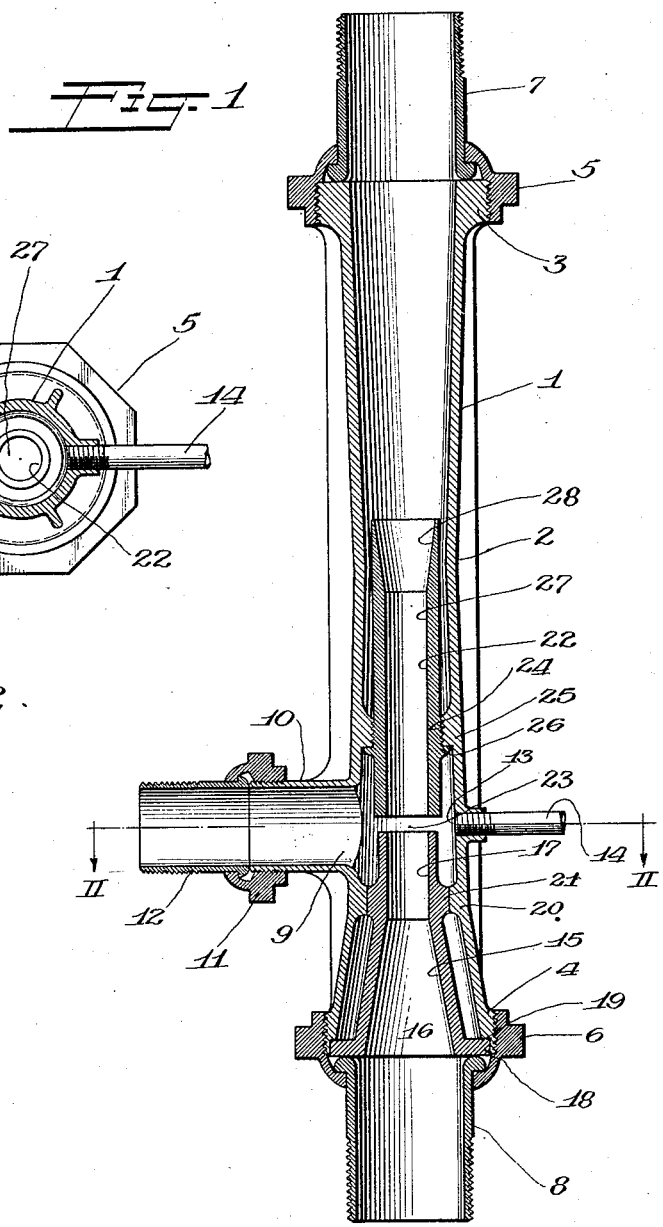
Inventor:
John O. Woodsome.
by: Charles Hill
Attys.

Patented June 7, 1932

1,862,130

UNITED STATES PATENT OFFICE

JOHN O. WOODSOME, OF DETROIT, MICHIGAN

VENTURI STEAM FITTING

Application filed March 12, 1928. Serial No. 261,041.

This invention relates to Venturi fittings and more particularly to a circulator of the Venturi type for use in connection with steam driers on paper machines and the like.

As described in my co-pending application entitled "Double wall Venturi steam fitting", Serial Number 80,230, circulators of this type are especially adapted for installation in steam lines leading to driers to induce a rapid circulation of steam through the driers.

This invention embodies certain improvements over former types of Venturi fittings in the use of definite dimensional relations to effect greater circulating efficiencies.

Other and further important objects of this invention will be apparent from the disclosures in the specification and the accompanying drawing.

This invention (in a preferred form) is illustrated in the drawing and hereinafter more fully described.

On the drawing:

Figure 1 is a longitudinal sectional view of a Venturi fitting embodying the principles of my invention, with parts in elevation, and Figure 2 is a sectional view taken on line II—II of Figure 1.

The reference numeral 1 indicates an outer shell gradually tapered toward an intermediate point as at 2 and provided with threaded ends 3 and 4 for connection through suitable couplings 5 and 6 to piping 7 and 8 respectively. Said shell 1 is provided with a side opening 9 formed by a nipple 10, the end of said nipple being threaded to receive a union 11 for connection with a pipe 12. A relatively smaller opening 13 is positioned directly opposite said opening 9 for receiving a small pipe 14.

In one end of said shell 1 there is mounted a throat member 15 having a relatively short inwardly tapered intake 16 terminating in a cylindrical throat 17. Said throat member 15 is flanged at its outer end as at 18 for positioning in a recess 19 formed in the end of said shell 1. Said flange 18 is thus adapted to be clamped within said recess 19 by the act of coupling said shell 1 to the pipe 8. Engaging shoulders 20 and 21 are formed on the inside of the shell 1 and on the outer wall of said throat member 15 to center and secure said throat member in position. It should be noted that said throat member 15 terminates substantially opposite the opening 9 for a purpose that will later appear.

A diffuser member 22 is likewise adapted to be positioned within the shell 1 in spaced relation to the end of said throat member 15 to provide a gap 23. As shown, said diffuser member is externally threaded, as at 24, for engagement with a threaded annular shoulder 25 formed on the interior wall of said shell 1 and is further provided with an abutting shoulder 26 serving as a stop. Said diffuser member 22 is formed with an elongated cylindrical bore 27 terminating in an outwardly flared discharge portion 28.

Preferably, the length of said cylindrical bore 27 is from three to seven times the diameter of the throat 17. For best efficiency, the ratio between the diameter of the throat and the diameter of the diffuser is as 1 to (1.03 to 2.00). With the ratio of 1 to 1.03 a high vacuum is obtained, but with resulting low capacity, whereas with the ratio of 1 to 2.00, low vacuum and high capacity results.

One of the principal applications of my Venturi fitting is illustrated in my co-pending application entitled "Double wall Venturi steam fitting", Serial No. 80,230, filed January 9th, 1926.

In that application the use of such Venturi fittings in connection with steam driers used on paper machines is fully explained. Steam on the way to the driers enters the tapered intake 16 of the throat member 15 and as a result of the constricted throat 17 the velocity head of the steam is greatly increased at the expense of its static head. Accordingly, sufficient suction is exerted at the gap 23 to draw into the diffuser member 22 through the pipe 12 and opening 9 a quantity of saturated steam from a drier.

This mixture of live and saturated steam after leaving the cylindrical bore 27, in expanding in the discharge portion 28 and in the remaining part of the shell 1 loses a greater portion of its velocity head and regains the amount of static head lost during its passage through the throat member 15. This is in accordance with Bernouilli's theory that in the flow of a fluid through a pipe, the sum of the velocity and static heads remains constant with the exception of friction losses incident to passage of said fluid through the pipe.

Where Venturi fittings of the above construction are installed in the steam lines leading to steam driers, it has been found that a much more rapid circulation of steam through the driers is effected with resulting higher heat transfer efficiencies through the drier shell to the web of paper or the like being dried. The increase in the efficiency of the driers thus obtained over the efficiency of driers not equipped with my Venturi fittings will average from two and one-half to ten per cent.

Some of the principal advantages in the construction of the Venturi fittings described are that the throat and diffuser members may be readily removed for examination and replacement and further that different size throat and diffuser members may be used interchangeably with the same shells. This latter feature is very important, inasmuch as the dimensional relations between the throat and diffuser members must be varied to take care of the steam requirements of different drier installations.

I am aware that numerous details of the process may be varied through a wide range without departing from the principles of this invention, and I, therefore, do not purpose limiting the patent granted hereon otherwise than necessitated by the prior art.

I claim as my invention:

1. In a Venturi fitting, a throat member and a diffuser member in alinement therewith but spaced therefrom said diffuser having a cylindrical bore the length of which is from three to seven times the inside diameter of said throat.

2. In a Venturi fitting, a throat member having an inwardly tapering intake extending into a constricted cylindrical throat and a diffuser member spaced from the end of said throat and having a cylindrical bore terminating in a flared discharge end, the length of said cylindrical bore being from three to seven times the inside diameter of said throat.

3. In a Venturi fitting, a throat member having an inwardly tapered intake portion terminating at the inner end in a uniform diameter throat and a diffuser member spaced from said throat end and having a cylindrical bore terminating in a flared discharge portion, the length of said cylindrical bore being from three to seven times the diameter of said throat.

4. In a Venturi fitting, a throat member and a diffuser member in spaced alinement therewith, said throat member having a cylindrical throat and said diffuser member having a cylindrical bore, the length of said bore being from three to seven times the diameter of said throat and the diameter of said bore being from 1.03 to 2.00 times the diameter of said throat.

In testimony whereof I have hereunto subscribed my name at Detroit, Wayne County, Michigan.

JOHN O. WOODSOME.